(12) United States Patent
Gautam et al.

(10) Patent No.: US 10,495,113 B2
(45) Date of Patent: Dec. 3, 2019

(54) ACOUSTIC DAMPER WITH RESONATOR MEMBERS ARRANGED IN-PARALLEL

(71) Applicant: HONEYWELL INTERNATIONAL INC., Morris Plains, NJ (US)

(72) Inventors: Bhushan Singh Gautam, Karnataka (IN); Gladys Gaude, Girmont (FR)

(73) Assignee: GARRETT TRANSPORATION I INC., Torrance, CA (US)

( * ) Notice: Subject to any disclaimer, the term of this patent is extended or adjusted under 35 U.S.C. 154(b) by 338 days.

(21) Appl. No.: 15/431,798

(22) Filed: Feb. 14, 2017

(65) Prior Publication Data

US 2018/0231028 A1    Aug. 16, 2018

(51) Int. Cl.

| F04D 29/66 | (2006.01) |
| F04D 17/10 | (2006.01) |
| F04D 29/42 | (2006.01) |
| F02B 33/40 | (2006.01) |
| F02M 35/12 | (2006.01) |
| F02B 33/44 | (2006.01) |
| F02B 37/00 | (2006.01) |
| F02M 35/10 | (2006.01) |

(52) U.S. Cl.
CPC ............ *F04D 29/665* (2013.01); *F02B 33/40* (2013.01); *F02B 33/44* (2013.01); *F02B 37/00* (2013.01); *F02M 35/10157* (2013.01); *F02M 35/1266* (2013.01); *F04D 17/10* (2013.01); *F04D 29/4206* (2013.01); *Y02T 10/144* (2013.01)

(58) Field of Classification Search
CPC .... F04D 17/10; F04D 29/4206; F04D 29/665; F02B 33/40; F02B 33/44; F02B 37/00; F02M 35/10157; F02M 35/1266; Y02T 10/144

See application file for complete search history.

(56) References Cited

U.S. PATENT DOCUMENTS

| 2,075,265 A | * | 3/1937 | Bourne ..................... F01N 1/02 |
| | | | 181/273 |
| 3,685,616 A | * | 8/1972 | Malkiewicz ............ F01N 1/003 |
| | | | 181/266 |

(Continued)

FOREIGN PATENT DOCUMENTS

| DE | 10112764 A1 | 9/2002 |
| DE | 102007042869 A1 | 3/2009 |

(Continued)

OTHER PUBLICATIONS

Extended EP Search Report for Application No. 18156384.2 dated Jun. 25, 2018.

*Primary Examiner* — Igor Kershteyn (74) *Attorney, Agent, or Firm* — Lorenz & Kopf, LLP (57) ABSTRACT

An acoustic damper includes an upstream wall with an inlet aperture and a downstream wall with an outlet aperture. The acoustic damper includes a first resonator that is supported by at least one of the upstream wall and the downstream wall. The acoustic damper also includes a second resonator that is supported by at least one of the upstream wall and the downstream wall. The first resonator and the second resonator are arranged in-parallel. Also, the first resonator and the second resonator are configured to cooperatively attenuate acoustic energy associated with a fluid flowing from the inlet aperture to the outlet aperture.

15 Claims, 6 Drawing Sheets

(56) References Cited

U.S. PATENT DOCUMENTS

| | | | |
|---|---|---|---|
| 4,450,932 A * | 5/1984 | Khosropour | F01N 3/043 |
| | | | 181/211 |
| 4,969,536 A | 11/1990 | Allen | |
| 5,952,625 A * | 9/1999 | Huff | F01N 1/06 |
| | | | 181/265 |
| 6,595,319 B1 * | 7/2003 | Huff | F01N 1/02 |
| | | | 181/250 |
| 6,983,820 B2 | 1/2006 | Boast et al. | |
| 7,794,213 B2 | 9/2010 | Gaude et al. | |
| 2013/0263822 A1 * | 10/2013 | Denker | F16L 55/0331 |
| | | | 123/434 |
| 2013/0327584 A1 * | 12/2013 | Trumler | F02M 35/1266 |
| | | | 181/196 |

FOREIGN PATENT DOCUMENTS

| | | |
|---|---|---|
| DE | 102010049578 A1 | 4/2012 |
| EP | 0573895 A1 | 12/1993 |
| EP | 1260697 A2 | 11/2002 |
| WO | 2012/052548 A2 | 4/2012 |

* cited by examiner

ACOUSTIC DAMPER WITH RESONATOR MEMBERS ARRANGED IN-PARALLEL

TECHNICAL FIELD

The present disclosure generally relates to an acoustic damper and, more particularly, to an acoustic damper with resonator members arranged in-parallel.

BACKGROUND

Some devices include one or more acoustic dampers for reducing undesirable noise during operation. For example, in a vehicle engine system, gas flowing from a turbocharger may create audible pulsation or hiss. Therefore, an acoustic damper may be included to reduce the noise.

In many cases, the acoustic damper may take up a substantial amount of space. Thus, it may be difficult to fit the acoustic damper within the system. Also, reducing the size of the acoustic damper can decrease its noise-reducing effectiveness.

Additionally, some acoustic dampers may be effective for reducing noise at one frequency. However, the same damper may not be effective for reducing noise at another. Accordingly, the acoustic damper may be of limited usefulness.

Thus, it is desirable to provide an engine system with a compact acoustic damper that effectively reduces noise across a range frequencies. Other desirable features and characteristics of the present disclosure will become apparent from the subsequent detailed description and the appended claims, taken in conjunction with the accompanying drawings and this background discussion.

BRIEF SUMMARY

In one embodiment, an acoustic damper is disclosed that includes an upstream wall with an inlet aperture and a downstream wall with an outlet aperture. The acoustic damper includes a first resonator that is supported by at least one of the upstream wall and the downstream wall. The acoustic damper also includes a second resonator that is supported by at least one of the upstream wall and the downstream wall. The first resonator and the second resonator are arranged in-parallel. Also, the first resonator and the second resonator are configured to cooperatively attenuate acoustic energy associated with a fluid flowing from the inlet aperture to the outlet aperture.

In another embodiment, an acoustic damper includes a first resonator with a first hollow cylinder that extends about an axis in a circumferential direction. The acoustic damper also includes a second resonator with a second hollow cylinder that extends about the axis in the circumferential direction. The second hollow cylinder is surrounded by the first hollow cylinder. The first hollow cylinder and the second hollow cylinder are configured to cooperatively attenuate acoustic energy associated with a fluid flowing through the acoustic damper.

In an additional embodiment, a vehicle engine system is disclosed that includes a turbocharger with a compressor section. The compressor section has a housing. The vehicle engine system also includes an acoustic damper that is in fluid communication with the housing. The acoustic damper is configured to receive airflow from the compressor section. The acoustic damper includes an upstream wall with an inlet aperture configured to receive airflow from the compressor section. The acoustic damper also includes a downstream wall with an outlet aperture configured to outlet airflow from the acoustic damper. The acoustic damper further includes a first resonator that is supported by at least one of the upstream wall and the downstream wall. Additionally, the acoustic damper includes a second resonator that is supported by at least one of the upstream wall and the downstream wall. The first resonator and the second resonator are arranged in-parallel. Also, the first resonator and the second resonator are configured to cooperatively attenuate acoustic energy associated with the airflow from the inlet aperture to the outlet aperture.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an acoustic damper with improved acoustic dampening characteristics. In particular, example embodiments include a passive acoustic dampener with a plurality of resonators that are arranged in-parallel with one another. The different resonators may be tuned differently from each other. In some embodiments, the resonators may be substantially cylindrical and hollow. The resonators may be of different lengths from one another. The resonators may also be of different widths (e.g., different radii) from one another. Also, at least one resonator may surround another resonator. The resonators may be arranged substantially coaxial with one another in some embodiments. In some embodiments, the resonators may be coaxial and centered on a longitudinal axis of the acoustic damper, and the longitudinal axis may extend through the fluid inlet and/or outlet of the acoustic damper. Also, the resonators may be arranged such that an inner resonator extends circumferentially about the longitudinal axis, and the inner resonator is surrounded by one or more progressively wider resonators. Additionally, the resonators may be supported by a side support member (e.g., a wall on the inlet side of the damper). The resonators may be arranged such that the shortest resonator is closest to the longitudinal axis, and the resonators are progressively longer the further away the resonator is from the longitudinal axis. Accordingly, the acoustic damper may be relatively compact while providing effective acoustic energy dampening for fluid flow therethrough. Additional details of the present disclosure will be discussed below.

Figure 1:
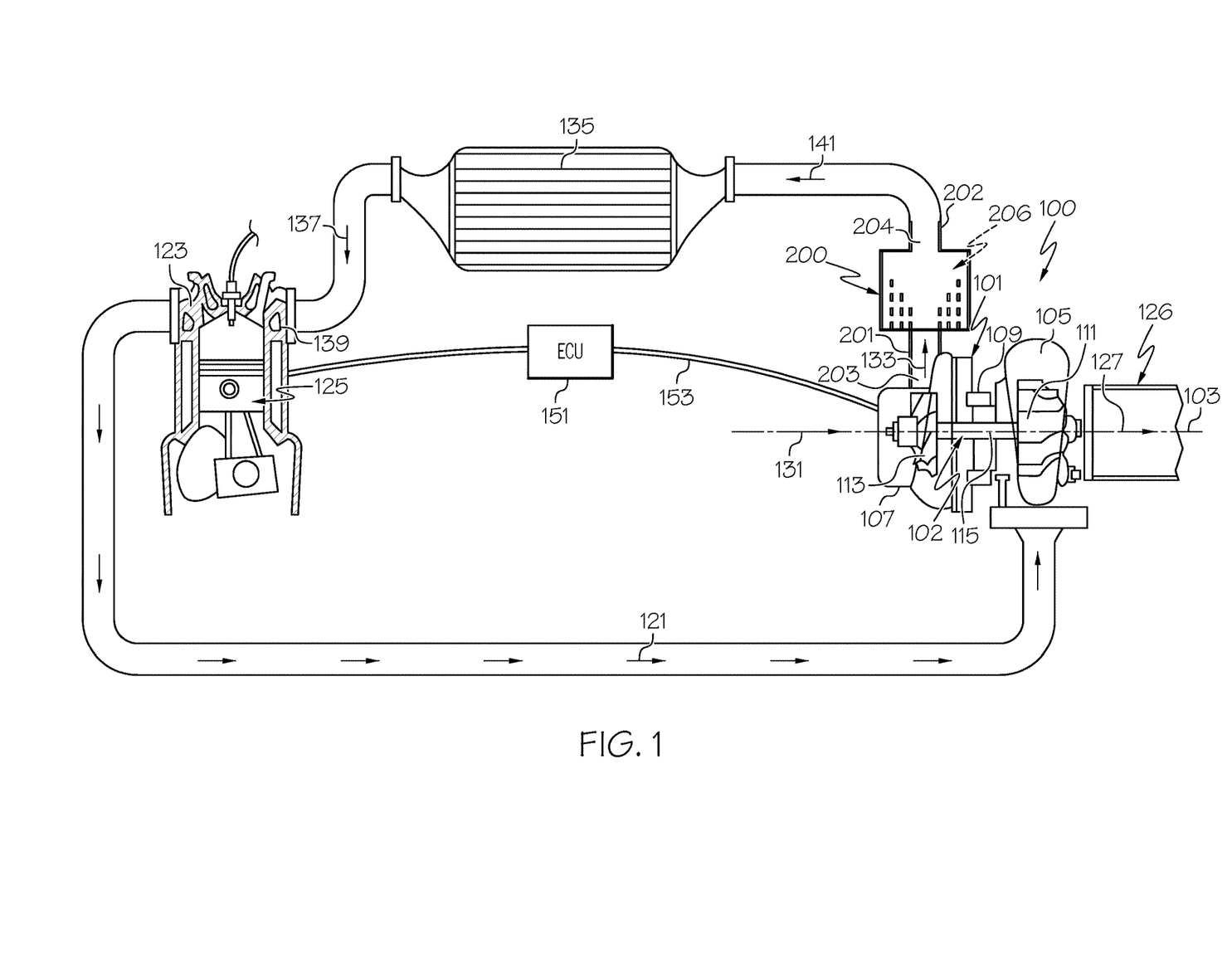
FIG. 1 is a schematic view of a vehicle engine system, which includes an acoustic damper according to example embodiments of the present disclosure.

FIG. 1 is a schematic view of an example turbocharger 100 that includes a turbocharger housing 101 and a rotor 102. The rotor 102 is configured to rotate within the turbocharger housing 101 about an axis of rotor rotation 103. The rotor 102 may be supported for rotation about the axis 103 via one or more bearings (not shown). In some embodiments, the rotor 102 may be rotationally supported by thrust bearings and a plurality of journal bearings. Alternatively, other bearings may be included.

As shown in the illustrated embodiment, the turbocharger housing 101 may include a turbine housing 105, a compressor housing 107, and a bearing housing 109. The bearing housing 109 may be disposed between the turbine and compressor housings 105, 107. Also, in some embodiments, the bearing housing 109 may contain the bearings of the rotor 102.

Additionally, the rotor 102 includes a turbine wheel 111, a compressor wheel 113, and a shaft 115. The turbine wheel 111 is located substantially within the turbine housing 105. The compressor wheel 113 is located substantially within the compressor housing 107. The shaft 115 extends along the axis of rotation 103, through the bearing housing 109, to connect the turbine wheel 111 to the compressor wheel 113. Accordingly, the turbine wheel 111 and the compressor wheel 113 rotate together about the axis 103.

The turbine housing 105 and the turbine wheel 111 cooperate to form a turbine (i.e., turbine section, turbine stage) configured to circumferentially receive a high-pressure and high-temperature exhaust gas stream 121 from an engine, e.g., from an exhaust manifold 123 of an internal combustion engine 125. The turbine wheel 111 (and thus the rotor 102) is driven in rotation around the axis 103 by the high-pressure and high-temperature exhaust gas stream 121, which becomes a lower-pressure and lower-temperature exhaust gas stream 127 that is released into a downstream exhaust pipe 126. In other embodiments, the engine 125 may be of another type, such as a diesel fueled engine.

The compressor housing 107 and compressor wheel 113 form a compressor (i.e., compressor section, compressor stage). The compressor wheel 113, being driven in rotation by the exhaust-gas driven turbine wheel 111, is configured to compress received input air 131 (e.g., ambient air, or already-pressurized air from a previous-stage in a multi-stage compressor) into a pressurized air stream 133 that is ejected circumferentially from the compressor housing 107. The compressor housing 107 may have a shape (e.g., a volute shape or otherwise) configured to direct and pressurize the air blown from the compressor wheel 113. Due to the compression process, the pressurized air stream is characterized by an increased temperature, over that of the input air 131.

In some embodiments, the pressurized air stream 133 may be channeled through an acoustic damper 200. Specifically, as shown in FIG. 1, an inlet pipe 201 may extend between an outlet of the compressor housing 107 to the acoustic damper 200, and an outlet pipe 202 may extend between an outlet of the acoustic damper 200 and an air cooler 135. Accordingly, the pressurized air stream 133 may flow through an inlet passage 203 of the inlet pipe 201, through the acoustic damper 200, and flow away from the acoustic damper 200 via an outlet passage 204 of the outlet pipe 202. The acoustic damper 200 is configured to reduce, dampen, and attenuate acoustic energy associated with the pressurized airstream 133 and convert it to an attenuated airstream 141. In some embodiments, the acoustic damper 200 may include a plurality of resonators 206 that are tuned differently from one another for reducing the acoustic energy of the pressurized airstream 133. Also, the resonators 206 may be arranged in-parallel with one another such that the acoustic damper 200 is compact and, yet, effective at attenuating the acoustic energy.

The attenuated airstream 141 may be channeled through an air cooler 135 (i.e., intercooler), such as a convectively cooled charge air cooler. The air cooler 135 may be configured to dissipate heat from the attenuated air stream 141, increasing its density. The resulting cooled and pressurized output air stream 137 is channeled into an intake manifold 139 of the internal combustion engine 125, or alternatively, into a subsequent-stage, in-series compressor. The operation of the system may be controlled by an ECU 151 (engine control unit) that connects to the remainder of the system via communication connections 153.

It will be appreciated that the acoustic damper 200 may be located, positioned, and arranged differently within the system of FIG. 1 or within another system of a vehicle. For example, in additional embodiments, the acoustic damper 200 may be integrated within the compressor housing 107. For example, a portion of the acoustic damper 200 may be integrally connected to a portion of the compressor housing 107 such that the portions collectively define a unitary, one-piece member (and such that the inlet pipe 201 is omitted). Additionally, the acoustic damper 200 may be disposed at any location, either upstream of the compressor inlet or downstream of the compressor outlet. Also, in some embodiments, the acoustic damper 200 may be arranged upstream of the turbine inlet (i.e., to receive the exhaust gas stream 121), or the acoustic damper 200 may be arranged downstream of the turbine outlet (i.e., to receive the exhaust gas stream 127). Moreover, it will be appreciated that FIG. 1 schematically illustrates the acoustic damper 200, the turbocharger 100, the IC engine 125, and other components; therefore, these components are not necessarily drawn to scale.

Additionally, it will be appreciated that the acoustic damper 200 may be incorporated within a system other than an engine system and/or other than a turbocharger system. For example, the acoustic damper 200 may be incorporated within another system through which a fluid (e.g., air or other gas) flows without departing from the scope of the present disclosure.

Figure 2:
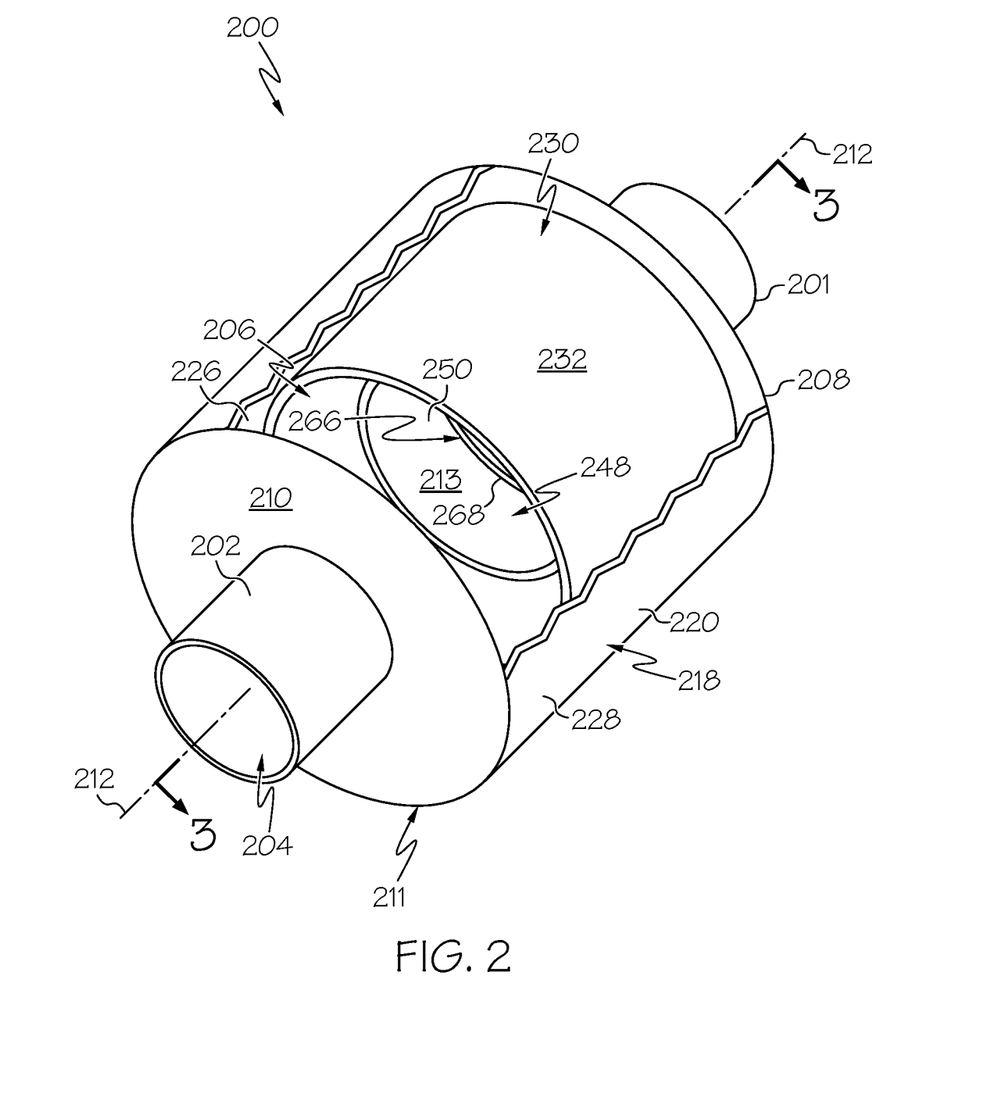
FIG. 2 is a perspective view of the acoustic damper of FIG. 1 with a portion of the outer resonator cut-away to show contents within the damper.
Figure 3:
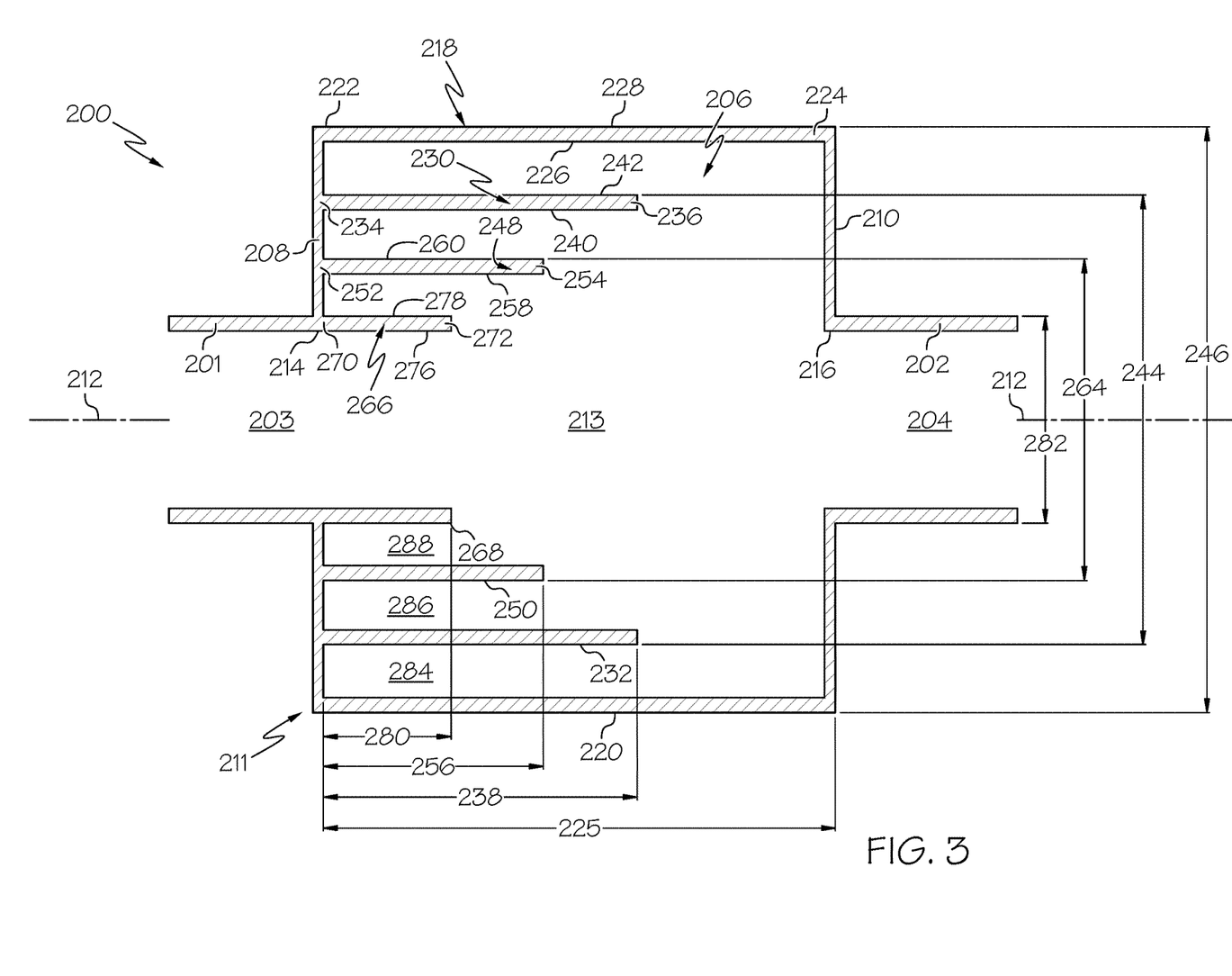
FIG. 3 is a longitudinal cross section of the acoustic damper taken along the line 3-3 of FIG. 2.

Referring now to FIGS. 2 and 3, example embodiments of the acoustic damper 200 will be discussed in detail. In some embodiments, the acoustic damper 200 may include an upstream wall 208. The upstream wall 208 may be a relatively flat and thin plate. In some embodiments, the upstream wall 208 may be rounded (e.g., circular).

The acoustic damper 200 may also include a downstream wall 210. The downstream wall 210 may be a relatively flat and thin plate. In some embodiments, the downstream wall 210 may be rounded (e.g., circular).

The upstream wall 208 may be separated and spaced apart from the downstream wall 210 along an axis 212. The axis 212 may be linear and straight in some embodiments. In some embodiments, the upstream wall 208 and/or the downstream wall 210 may be substantially centered on the axis 212.

As shown in FIG. 3, the upstream wall 208 may include an inlet aperture 214. The inlet aperture 214 may be a rounded (e.g., circular) hole in some embodiments. The inlet pipe 201 may be attached to the upstream wall 208, and the inlet passage 203 may be in fluid communication with the inlet aperture 214 to feed gas flow into the acoustic damper 200.

The downstream wall 210 may include an outlet aperture 216. The outlet aperture 216 may be a rounded (e.g., circular) hole in some embodiments. The outlet pipe 202 may be attached to the downstream wall 210, and the outlet passage 204 may be in fluid communication with the outlet aperture 216 to receive gas flow from the acoustic damper 200.

The acoustic damper 200 may also include any number of resonators 206. The plurality of resonators 206 may be quarter wave resonators for reducing resonance. The resonators 206 may be tuned differently from each other. Thus, while the individual resonators 206 may effectively attenuate acoustic energy over a relatively narrow frequency range (e.g., to attenuate a specific frequency), the plurality of resonators 206 may work together to attenuate a range of frequencies.

The plurality of resonators 206 may include a first resonator 218. In some embodiments, the first resonator 218 may be embodied by or may otherwise include a first cylinder 220. (A portion of the first cylinder 220 is cut-away in FIG. 2 to reveal the interior of the damper 200. The longitudinal cross section of the first cylinder 220 is shown in cross section in FIG. 3, and it will be appreciated that the cross section may be substantially continuous in the circumferential direction about the axis 212.)

As shown in FIG. 3, the first cylinder 220 may be a hollow cylinder or tube with an upstream end 222 and an opposing downstream end 224. The first cylinder 220 may further include an inner surface 226 and an outer surface 228. The inner surface 226 may face radially toward the axis 212, and the outer surface 228 may face radially away from the axis 212. The first cylinder 220 may have a longitudinal length 225 measured from the upstream end 222 to the downstream end 224 along the axis 212. In some embodiments, the first cylinder 220 may be substantially continuous along its length 225, from the upstream end 222 to the downstream end 224.

In some embodiments, the upstream end 222, the downstream end 224, and areas of the first cylinder 220 therebetween may be annular and rounded in the circumferential direction about the axis 212. Specifically, the first cylinder 220 may have a circular cross section taken perpendicular to the axis 212. However, it will be appreciated that the cross section of the first cylinder 220 may have a different shape without departing from the scope of the present disclosure. In some embodiments, the first cylinder 220 may be substantially continuous in the circumferential direction about the axis 212.

The first cylinder 220 may also have a width 246. The width 246 may be measured radially and perpendicular to the axis 212. In embodiments in which the first cylinder 220 has a circular cross section, the width 246 may be a diameter of the first cylinder 220.

In some embodiments, the first cylinder 220 may be a right circular cylinder. Thus, the first cylinder 220 may extend longitudinally and substantially parallel to the axis 212. Also, the first cylinder 220 may be substantially centered on the axis 212 with the upstream end 222 and the downstream end 224 being substantially coaxial with respect to the axis 212.

The upstream end 222 may be attached (e.g., fixed) to the upstream wall 208 of the damper 200. Also, the downstream end 224 may be attached (e.g., fixed) to the downstream wall 210.

In some embodiments, the first cylinder 220, the upstream wall 208, and the downstream wall 210 may cooperate to define an outer housing 211 of the acoustic damper 200. In other words, the outer surface 228 of the first cylinder 220, the outer face of the upstream wall 208, and the outer face of the downstream wall 210 may collectively define the outer surface of the damper 200. Meanwhile, the inner surface 226 of the first cylinder 220 and the opposing inner surfaces of the upstream and downstream walls 208, 210 may cooperate to define an interior chamber 213 of the acoustic damper 200. Accordingly, the inlet aperture 214 provides access into the interior chamber 213, and the outlet aperture 216 provides access out of the interior chamber 213.

The plurality of resonators 206 may also include a second resonator 230. The second resonator 230 may be embodied by or may otherwise include a second cylinder 232. The second cylinder 232 may be a hollow cylinder that includes an upstream end 234 and an opposing downstream end 236. The second cylinder 232 may further include an inner surface 240 and an outer surface 242. The second cylinder 232 may have a longitudinal length 238 measured from the upstream end 234 to the downstream end 236 along the axis 212. In some embodiments, the length 238 of the second cylinder 232 may be less than the length 225 of the first cylinder 220. Also, in some embodiments, the second cylinder 232 may be substantially continuous along its length 225, from the upstream end 234 to the downstream end 236.

In some embodiments, the upstream end 234, the downstream end 236, and areas of the second cylinder 232 therebetween may be annular and rounded in the circumferential direction about the axis 212. Specifically, the second cylinder 232 may have a circular cross section taken perpendicular to the axis 212. However, it will be appreciated that the cross section of the second cylinder 232 may have a different shape without departing from the scope of the present disclosure. In some embodiments, the second cylinder 232 may be substantially continuous in the circumferential direction about the axis 212.

The second cylinder 232 may also have a width 244. The width 244 may be measured radially and perpendicular to the axis 212. In embodiments in which the second cylinder 232 has a circular cross section, the width 244 may be a diameter of the second cylinder 232. In some embodiments, the width 244 of the second cylinder 232 may be less than the width 246 of the first cylinder 220.

In some embodiments, the second cylinder 232 may be a right circular cylinder. Thus, the second cylinder 232 may extend longitudinally and substantially parallel to the axis 212. Also, the second cylinder 232 may be substantially centered on the axis 212 with the upstream end 234 and the downstream end 236 being substantially coaxial with respect to the axis 212.

The upstream end 234 may be attached (e.g., fixed) to the upstream wall 208. Also, the downstream end 236 may be spaced apart and separated at a distance from the downstream wall 210. Accordingly, the second cylinder 232 may be cantilevered in that it is fixed at one end (the upstream end 234) to the upstream wall 208 and is suspended therefrom.

In some embodiments, the second cylinder 232 may be surrounded by the first cylinder 220. As shown in the illustrated embodiment, the second cylinder 232 may be completely surrounded by the first cylinder 220 along its entire length 238. Also, in some embodiments, the second cylinder 232 may be coaxial with the first cylinder 220 and centered on the axis 212.

The plurality of resonators 206 may also include a third resonator 248. The third resonator 248 may be embodied by or may otherwise include a third cylinder 250. The third cylinder 250 may be a hollow cylinder that includes an upstream end 252 and an opposing downstream end 254. The third cylinder 250 may further include an inner surface 258 and an outer surface 260. The third cylinder 250 may have a longitudinal length 256 measured from the upstream end 252 to the downstream end 254 along the axis 212. In some embodiments, the length 256 of the third cylinder 250 may be less than the length 238 of the second cylinder 232. Also, in some embodiments, the third cylinder 250 may be substantially continuous along its length 256, from the upstream end 252 to the downstream end 254.

The upstream end 252, the downstream end 254 and areas of the third cylinder 250 therebetween may be annular and rounded in the circumferential direction about the axis 212. Specifically, the third cylinder 250 may have a circular cross section taken perpendicular to the axis 212. However, it will be appreciated that the cross section of the third cylinder 250 may have a different shape without departing from the scope of the present disclosure. In some embodiments, the third cylinder 250 may be substantially continuous in the circumferential direction about the axis 212.

The third cylinder 250 may also have a width 264. The width 264 may be measured radially and perpendicular to the axis 212. In embodiments in which the third cylinder 250 has a circular cross section, the width 264 may be a diameter of the third cylinder 250. In some embodiments, the width 264 of the third cylinder 250 may be less than the width 244 of the second cylinder 232.

The third cylinder 250 may be a right circular cylinder. Thus, the third cylinder 250 may extend longitudinally and substantially parallel to the axis 212. Also, the third cylinder 250 may be substantially centered on the axis 212 with the upstream end 252 and the downstream end 254 being substantially coaxial with respect to the axis 212.

The upstream end 252 may be attached (e.g., fixed) to the upstream wall 208. Also, the downstream end 254 may be spaced apart and separated at a distance from the downstream wall 210. Accordingly, the third cylinder 250 may be cantilevered in that it is fixed at one end (the upstream end 252) to the upstream wall 208 and is suspended therefrom.

In some embodiments, the third cylinder 250 may be surrounded by the second cylinder 232. As shown in the illustrated embodiment, the third cylinder 250 may be completely surrounded by the second cylinder 232 along its entire length 256. Also, in some embodiments, the third cylinder 250 may be coaxial with the second cylinder 232 and/or the first cylinder 220. The third cylinder 250, the second cylinder 232, and the first cylinder 220 may be substantially coaxial and centered on the axis 212 in some embodiments.

The plurality of resonators 206 may also include a fourth resonator 266. The fourth resonator 266 may be embodied by or may otherwise include a fourth cylinder 268. The fourth cylinder 268 may be a hollow cylinder that includes an upstream end 270 and an opposing downstream end 272. The fourth cylinder 268 may further include an inner surface 276 and an outer surface 278. The fourth cylinder 268 may have a longitudinal length 280 measured from the upstream end 270 to the downstream end 272 along the axis 212. In some embodiments, the length 280 of the fourth cylinder 268 may be substantially continuous along its length 280, from the upstream end 270 to the downstream end 272.

The upstream 270, the downstream end 272 and areas of the fourth cylinder 368 therebetween may be annular and rounded in the circumferential direction about the axis 212. Specifically, the fourth cylinder 268 may have a circular cross section taken perpendicular to the axis 212. However, it will be appreciated that the cross section of the fourth cylinder 268 may have a different shape without departing from the scope of the present disclosure. In some embodiments, the fourth cylinder 268 may be substantially continuous in the circumferential direction about the axis 212.

The fourth cylinder 268 may also have a width 282. The width 282 may be measured radially and perpendicular to the axis 212. In embodiments in which the fourth cylinder 268 has a circular cross section, the width 282 may be a diameter of the fourth cylinder 268. In some embodiments, the width 282 of the fourth cylinder 268 may be less than the width 264 of the third cylinder 250.

The fourth cylinder 268 may be a right circular cylinder. Thus, the fourth cylinder 268 may extend longitudinally and substantially parallel to the axis 212. Also, the fourth cylinder 268 may be substantially centered on the axis 212 with the upstream end 270 and the downstream end 272 being substantially coaxial with respect to the axis 212.

The upstream end 270 may be attached (e.g., fixed) to the upstream wall 208. Also, the downstream end 272 may be spaced apart and separated at a distance from the downstream wall 210. Accordingly, the fourth cylinder 268 may be cantilevered in that it is fixed at one end (the upstream end 270) to the upstream wall 208 and is suspended therefrom.

Additionally, the fourth cylinder 268 may be substantially coaxial with the inlet pipe 201. Additionally, the width 282 of the fourth cylinder 268 may be substantially equal to that of the inlet pipe 201. As such, the inner diameter surface of the inlet pipe 201 may be substantially flush with the inner surface 276 of the fourth cylinder 268.

In some embodiments, the fourth cylinder 268 may be surrounded by the third cylinder 250. As shown in the illustrated embodiment, the fourth cylinder 268 may be completely surrounded by the third cylinder 250 along its entire length 280. Also, in some embodiments, the fourth cylinder 268 may be coaxial with the third cylinder 250, the second cylinder 232, and/or the first cylinder 220. The fourth cylinder 268, the third cylinder 250, the second cylinder 232, and the first cylinder 220 may be substantially coaxial and centered on the axis 212 in some embodiments.

As shown in FIG. 3, a first radial gap 284 may be defined between the inner surface 226 of the first cylinder 220 and the outer surface 242 of the second cylinder 232. Likewise, a second radial gap 286 may be defined between the inner surface 240 of the second cylinder 232 and the outer surface 260 of the third cylinder 250. Moreover, a third radial gap 288 may be defined between the inner surface 258 of the third cylinder 250 and the outer surface 278 of the fourth cylinder 268. In some embodiments, at least two of the gaps 284, 286, 288 may be substantially equal. In some embodiments, each of the gaps 284, 286, 288 may be substantially equal to each other. However, in other embodiments, at least one gap 284, 286, 288 may be different from another.

The resonators 206 may be tuned differently from each other. In some embodiments, each of the resonators 206 may be tuned to a different resonant frequency. The tuning may be a result of the shape and/or volume of empty space enclosed within the respective resonator. Thus, the size and shape of the gap 284, 286, 288 between the adjacent resonators 206 may affect the tunings of the resonators 206. Also, the amount of overlap between adjacent resonators 206 (along the axis 212) may affect the tunings of the resonators 206. Accordingly, the acoustic damper 200 may be effective for reducing acoustic energy across a wide spectrum of frequencies.

Also, the plurality of resonators 206 (the first, second, third, and fourth resonators 218, 230, 248, 266) may be arranged in-parallel. The resonators 206 may be substantially coaxial and centered with respect to the axis 212. Also, the resonator 206 closest to the axis 212 (e.g., the fourth resonator 266) may be surrounded by progressively wider and longer resonators 206 (e.g., the third, second, and first resonators 248, 230, 218). The acoustic damper 200 may be substantially compact due to this in-parallel arrangement and, yet, the acoustic damper 200 may be effective for attenuating acoustic energy.

Figure 4:
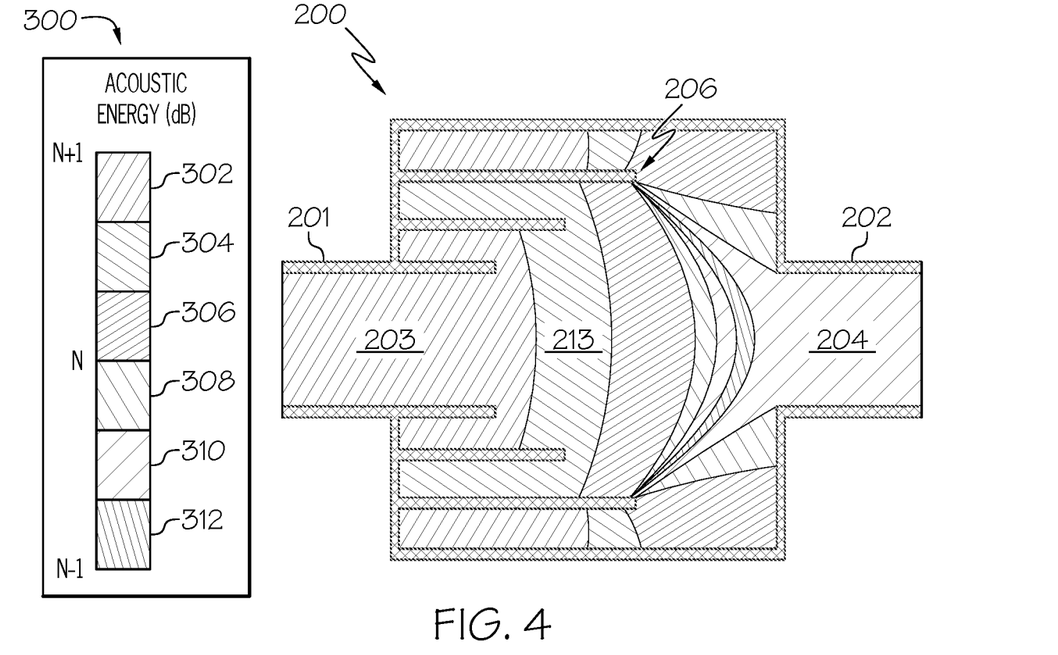
FIGS. 4-8 are cross sections of the acoustic damper of FIG. 3, wherein the different Figures represent the operation of the acoustic damper at different frequencies.
Figure 5:
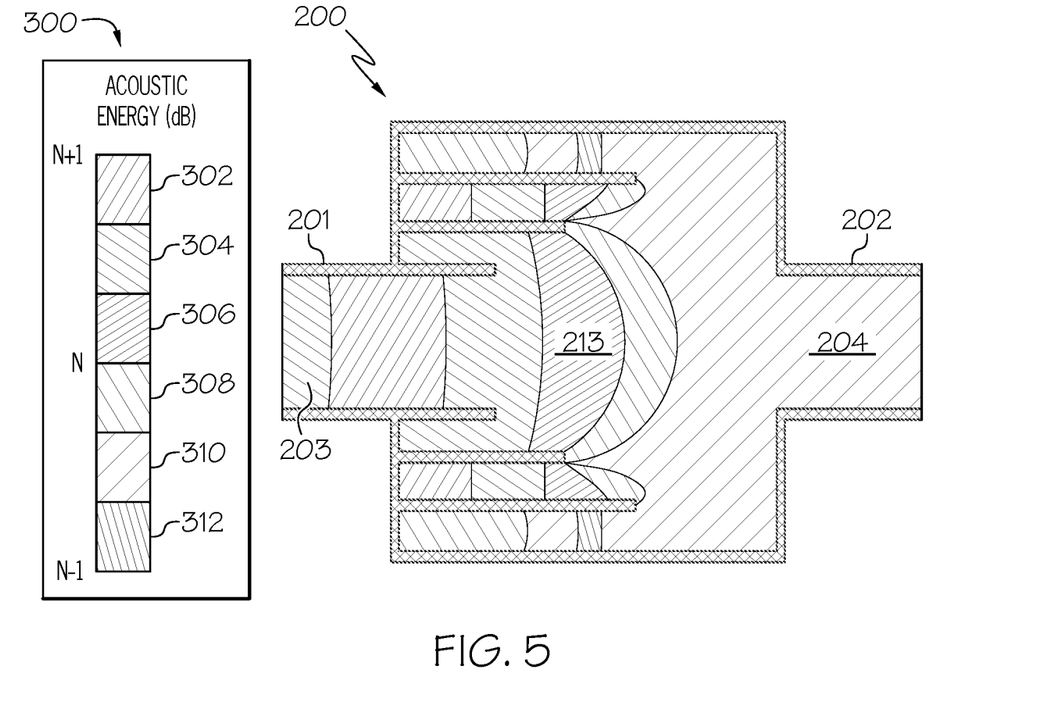
Figure 6:
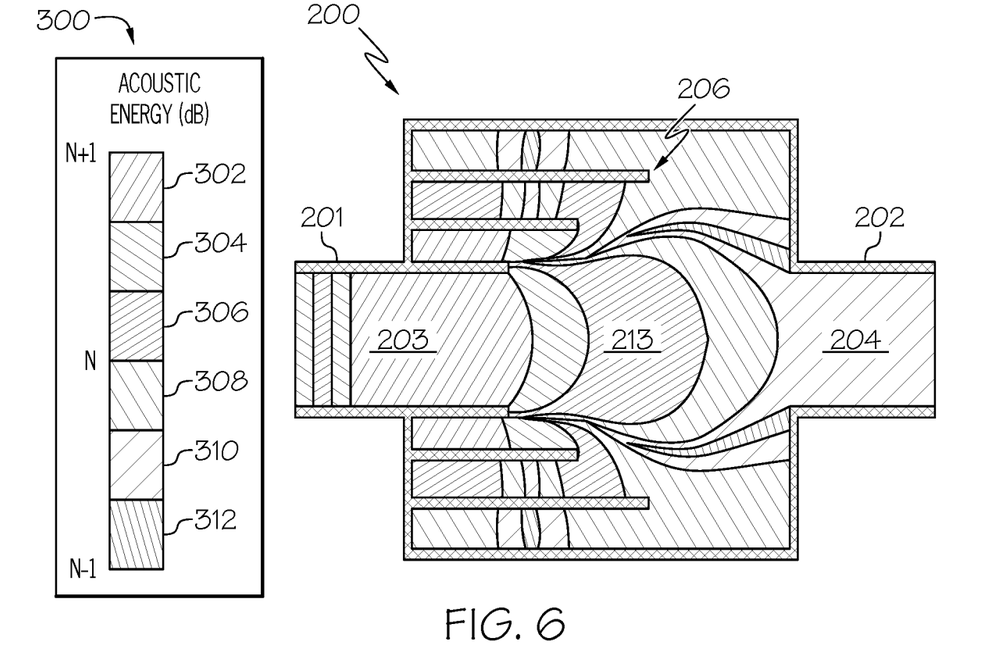
Figure 7:
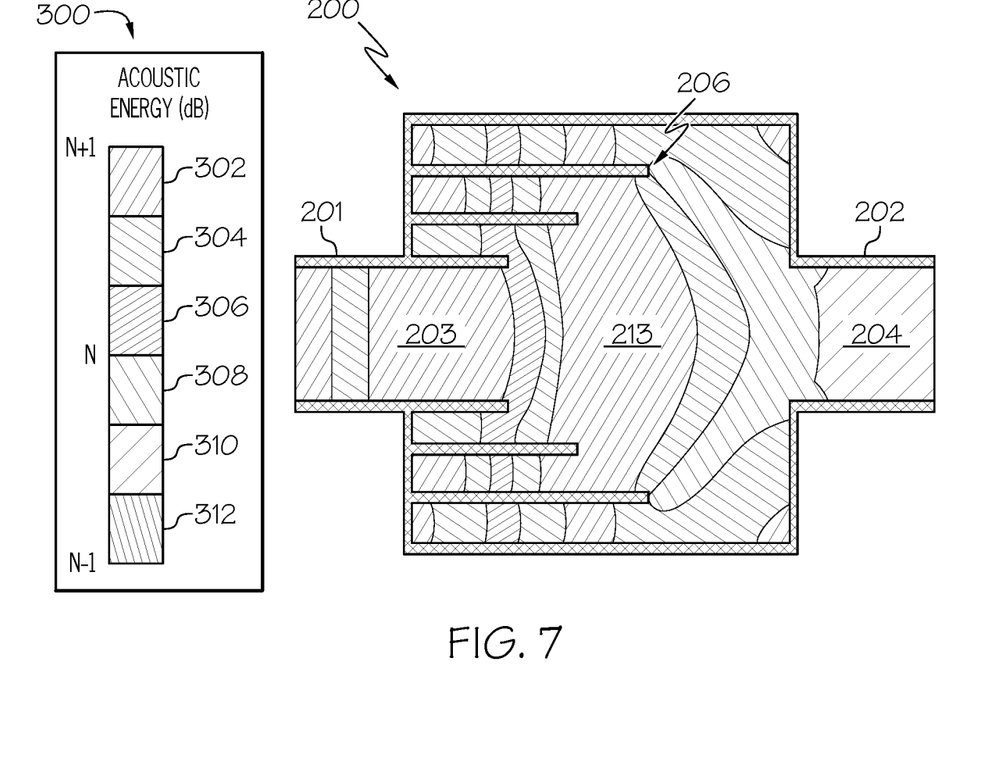
Figure 8:
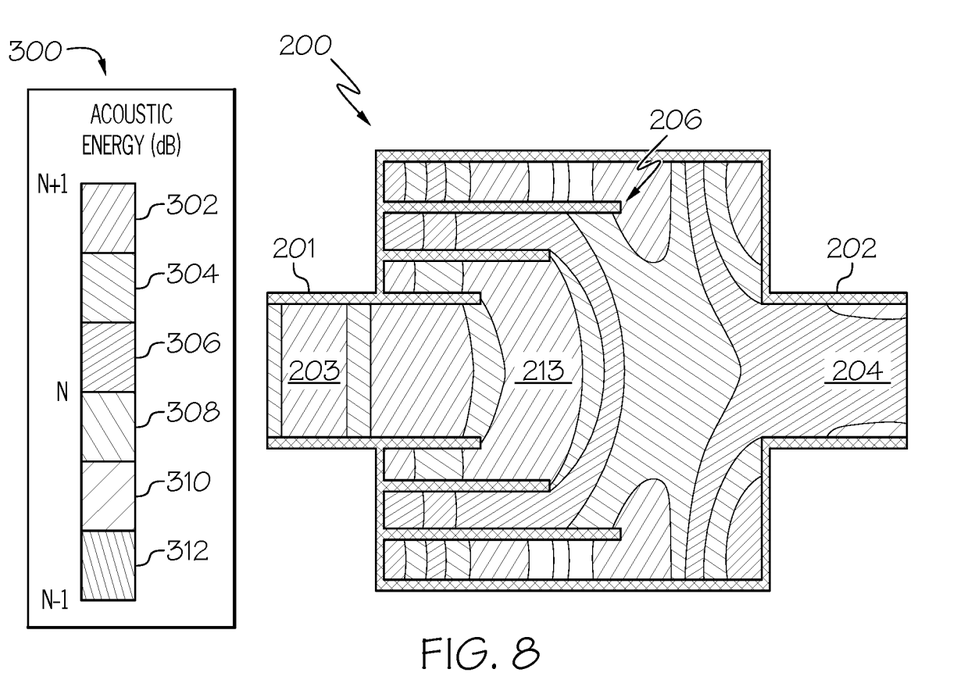

Referring now to FIGS. 4-8, operation of the acoustic damper 200 will be discussed. FIG. 4 may represent the damper 200 operating at a relatively low frequency, FIG. 5 may represent the damper 200 operating at a higher frequency, FIG. 6 may represent the damper 200 operating at an even higher frequency, FIG. 7 may represent the damper 200 operating at an even higher frequency, and FIG. 8 may represent the damper 200 operating at the highest frequency of the group. For example, FIG. 4 may represent the damper 200 operating at a frequency of 1060 Hz, FIG. 5 may represent the damper 200 operating at a frequency of 1470 Hz, FIG. 6 may represent the damper 200 operating at a frequency of 2340 Hz, FIG. 7 may represent the damper 200 operating at a frequency of 3220 Hz, and FIG. 8 may represent the damper 200 operating at a frequency of 4410 Hz.

Taking FIG. 4 as an example, the transmission loss of acoustic energy is represented by different zones within the damper 200, wherein each zone includes a respective symbol. The symbols are summarized in a key 300. As shown in the key, a first symbol 302 represents areas of the highest high acoustic energy (measured in decibels, dB). A second symbol 304 represents areas of lower acoustic energy. A third symbol 306 represents areas of even lower acoustic energy. A fourth symbol 308 represents areas of still lower acoustic energy. A fifth symbol 310 represents areas of even lower acoustic energy. A sixth symbol 312 represents areas of the lowest acoustic energy.

As such, FIG. 4 shows that the damper 200 generally causes acoustic energy transmission loss from the inlet passage 203, through the chamber 213, and to the outlet passage 204. Likewise, FIGS. 5-8 illustrate that the acoustic energy is attenuated as the air flows through the damper 200 at those frequencies as well. Thus, as stated above, the damper 200 may be very compact, but the damper 200 may also provide effective dampening across a wide range of frequencies.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. An acoustic damper comprising:
an upstream wall with an inlet aperture;
a downstream wall with an outlet aperture;
a first resonator with a first cylinder that is attached at a first end to the upstream wall and that is attached at a second end to the downstream wall, the upstream wall, the downstream wall, and the first cylinder cooperating to define a chamber;
a second resonator with a second cylinder attached to the upstream wall and surrounded by the first cylinder in the chamber;
a third resonator with a third cylinder that is attached to the upstream wall and surrounded by the second cylinder;
wherein the first resonator, the second resonator, and the third resonator are arranged in-parallel; and
wherein the first resonator, the second resonator, and the third resonator are configured to cooperatively attenuate acoustic energy associated with a fluid flowing from the inlet aperture to the outlet aperture.

2. The acoustic damper of claim 1, wherein the acoustic damper defines an axis;
wherein the first resonator and the second resonator are substantially coaxial with respect to the axis.

3. The acoustic damper of claim 1, wherein the first resonator extends along an axis between the upstream wall and the downstream wall;
wherein the first resonator has a first length measured along the axis;
wherein the second resonator has a second length measured along the axis;
wherein the third resonator has a third length measured along the axis;
wherein the first length is greater than the second length; and
wherein the second length is greater than the third length.

4. The acoustic damper of claim 1, wherein the first resonator extends along an axis between the upstream wall and the downstream wall;
wherein a first radial gap is defined between the first cylinder and the second cylinder;
wherein a second radial gap is defined between the second cylinder and the third cylinder; and
wherein the first radial gap is substantially equal to the second radial gap.

5. The acoustic damper of claim 1, wherein at least one of the first cylinder and the second cylinder is a right cylinder with an upstream end and a downstream end that are coaxially aligned with a common axis;
wherein the common axis is straight.

6. The acoustic damper of claim 5, wherein the at least one of the first cylinder and the second cylinder is a right circular cylinder.

7. The acoustic damper of claim 1, further comprising an inlet pipe with an inlet passage that is in fluid communication with the inlet aperture; and
wherein the inlet pipe is configured to be attached to a compressor section of a turbocharger.

8. An acoustic damper comprising:
a first resonator with a first hollow cylinder that extends about an axis in a circumferential direction, the first hollow cylinder extending along the axis between an upstream wall and a downstream wall, the first hollow cylinder having a first length measured along the axis;
a second resonator with a second hollow cylinder that extends about the axis in the circumferential direction, the second hollow cylinder having a second length measured along the axis;
a third resonator with a third hollow cylinder that extends about the axis in the circumferential direction, the third hollow cylinder having a third length measured along the axis;
wherein the second hollow cylinder is surrounded by the first hollow cylinder and the third hollow cylinder is surrounded by the second hollow cylinder;

wherein the first length is greater than the second length and the second length is greater than the third length; and wherein the first hollow cylinder, the second hollow cylinder, and the third hollow cylinder are configured to cooperatively attenuate acoustic energy associated with a fluid flowing through the acoustic damper.

9. The acoustic damper of claim 8, wherein the first hollow cylinder includes a first end and a second end, and wherein the second hollow cylinder includes a third end and a fourth end;

wherein the first end and the third end are attached to the upstream wall;

wherein the second end is attached to the downstream wall; and wherein the fourth end is spaced apart from the downstream wall.

10. The acoustic damper of claim 8, wherein the first cylinder and the second cylinder are substantially coaxial and centered on the axis.

11. The acoustic damper of claim 10, wherein the upstream wall includes an upstream aperture and the downstream wall includes a downstream aperture; and wherein the upstream aperture and the downstream aperture are substantially centered on the axis.

12. The acoustic damper of claim 10, wherein the first cylinder and the second cylinder are right circular cylinders.

13. The acoustic damper of claim 8, further comprising an inlet pipe with an inlet passage that is in fluid communication with the first and second hollow cylinders; and wherein the inlet pipe is configured to be attached to a compressor section of a turbocharger.

14. A vehicle engine system comprising:

a turbocharger with a compressor section, the compressor section having a housing; and an acoustic damper that is in fluid communication with the housing, the acoustic damper configured to receive airflow from the compressor section;

the acoustic damper including:

an upstream wall with an inlet aperture configured to receive airflow from the compressor section;

a downstream wall with an outlet aperture configured to receive outlet airflow from the acoustic damper;

a first resonator with a first cylinder that is attached at a first end to the upstream wall and that is attached at a second end to the downstream wall, the first cylinder having a first length measured from the first end to the second end, the upstream wall, the downstream wall, and the first cylinder cooperating to define a chamber;

a second resonator with a second cylinder attached to the upstream wall and surrounded by the first cylinder in the chamber, the second cylinder having a second length that is less than the first length;

a third resonator with a third cylinder that is attached to the upstream wall and surrounded by the second cylinder, the third cylinder having a third length that is less than the second length;

wherein the first resonator, the second resonator, and the third resonator are arranged in-parallel; and wherein the first resonator, the second resonator, and the third resonator are configured to cooperatively attenuate acoustic energy associated with the airflow from the inlet aperture to the outlet aperture.

15. The vehicle engine system of claim 14, wherein the acoustic damper defines an axis;

wherein the first resonator and the second resonator are substantially coaxial with respect to the axis.

* * * * *